US012565445B2

(12) United States Patent
Yagi et al.

(10) Patent No.: US 12,565,445 B2
(45) Date of Patent: Mar. 3, 2026

(54) OPTICAL FILTER GLASS CERAMIC AND OPTICAL FILTER

(71) Applicant: OHARA INC., Kanagawa (JP)

(72) Inventors: Toshitaka Yagi, Kanagawa (JP); Saya Kikkawa, Kanagawa (JP)

(73) Assignee: OHARA INC., Kanagawa (JP)

( * ) Notice: Subject to any disclaimer, the term of this patent is extended or adjusted under 35 U.S.C. 154(b) by 939 days.

(21) Appl. No.: 17/780,523

(22) PCT Filed: Sep. 18, 2020

(86) PCT No.: PCT/JP2020/035529
§ 371 (c)(1),
(2) Date: May 27, 2022

(87) PCT Pub. No.: WO2021/106332
PCT Pub. Date: Jun. 3, 2021

(65) Prior Publication Data
US 2022/0411320 A1 Dec. 29, 2022

(30) Foreign Application Priority Data

Nov. 27, 2019 (JP) ................................. 2019-214104

(51) Int. Cl.
*C03C 10/00* (2006.01)
*G02B 5/22* (2006.01)
*G02B 5/28* (2006.01)

(52) U.S. Cl.
CPC .......... *C03C 10/0045* (2013.01); *G02B 5/226* (2013.01); *G02B 5/288* (2013.01); *C03C 2214/20* (2013.01)

(58) Field of Classification Search
CPC . C03C 10/0045; C03C 2214/20; C03C 10/00; G02B 5/226
See application file for complete search history.

(56) References Cited

U.S. PATENT DOCUMENTS 6,410,466 B1 6/2002 Goto et al.
2004/0116268 A1 6/2004 Kobayashi et al.

2011/0135964 A1 6/2011 Yagi et al.
2016/0355434 A1 12/2016 Momono
2019/0375680 A1 12/2019 Yagi et al.

FOREIGN PATENT DOCUMENTS

| CN | 1283596 A | 2/2001 |
| CN | 101905952 A | 12/2010 |
| CN | 106045324 A | 10/2016 |
| CN | 110267924 A | 9/2019 |
| JP | 2001318222 A | 11/2001 |
| JP | 2002265234 A | * 9/2002 |
| JP | 2003137598 A | 5/2003 |
| JP | 200453997 A | 2/2004 |
| JP | 200731180 A | 2/2007 |
| JP | 20171937 A | 1/2017 |

OTHER PUBLICATIONS

JP2002265234A machine translation (Year: 2002).*
Wang Yingjun, Wen Ziyun, Wu Qingren, Zhou Xiya, "New Materials Science and Technology Inorganic Materials Volume (vol. 1) ", Guangzhou: South China University of Technology Press, Oct. 2016 (Oct. 2016), p. 459.
Zhang Hong, Hu Shuhua, Zhang Zhongkai, Bu Jiangrong, Dong Aijun, Wang Chengxiang, Leng Chengqiu, Zhang Binbing, Yi Ming, Liu Hang, "Research on Innovation and Development of Information Industry in Hubei", Wuhan: Hubei People's Press, Aug. 2010 (Aug. 2010), p. 89.

* cited by examiner

*Primary Examiner* — Cameron K Miller
(74) *Attorney, Agent, or Firm* — Li & Cai Intellectual Property Office

(57) ABSTRACT

A glass ceramic for an optical filter and an optical filter are obtained that have both thermal expansion characteristics for preventing refractive index fluctuations at a usage temperature of a filter member and mechanical characteristics considering durability, and further have excellent workability. An internal transmittance of the glass ceramic for an optical filter is 0.970 or more with respect to light having a wavelength of 1550 nm when a thickness of the glass ceramic is 1 mm. The glass ceramic includes, by mass % in terms of oxide, 40.0% to 70.0% of a $SiO_2$ component, 11.0% to 25.0% of an $Al_2O_3$ component, 5.0% to 19.0% of a $Na_2O$ component, 0% to 9.0% of a $K_2O$ component, 1.0% to 18.0% of one or more components selected from a MgO component and a ZnO component, 0% to 3.0% of a CaO component, and 0.5% to 12.0% of a $TiO_2$ component.

10 Claims, No Drawings

OPTICAL FILTER GLASS CERAMIC AND OPTICAL FILTER

FIELD OF THE DISCLOSURE

The present disclosure relates to a glass ceramic for an optical filter and an optical filter using the glass ceramic.

BACKGROUND OF THE DISCLOSURE

Optical filters include optical filters that cut a specific wavelength to transmit the specific wavelength and optical filters that reduce the light intensity regardless of the wavelength. Examples of the former type of optical filters include a bandpass filter that transmits only a specific wavelength, a notch pass filter that cuts only a specific wavelength, a high pass filter that transmits only a wavelength shorter or longer than a specific wavelength, and a low pass filter. The latter type of optical filters includes an ND filter.

In addition, there are absorption-type and interference-type optical filters. A typical example of an absorption-type optical filter is an ND filter, and a typical example of an interference-type optical filter is a bandpass filter. Plastic is used as a substrate for an absorption-type optical filter for photographs and the like, but glass is used for the substrate of an optical filter using a strong laser, because durability and heat resistance are required.

A bandpass filter may be formed by a dielectric multilayer film having a structure in which, for example, a dielectric thin film (H layer) having a high refractive index and a dielectric thin film (L layer) having a low refractive index are alternately laminated on a substrate material such as glass.

In a bandpass filter used in a wavelength division multiplexing (WDM) optical communication system, if a narrow band width is set for a wavelength being transmitted to apply the bandpass filter to a wavelength having higher density, there is a problem concerning the temperature stability of the center wavelength of the band. That is, the bandpass filter is a sensitive element in which a center wavelength of the band fluctuates even with a slight temperature change, and thus, temperature compensation needs to be performed by a temperature controller when the bandpass filter is used. However, due to space problems when the bandpass filter is used, it is practically impossible to attach a temperature controller. The band width needs to be narrowed as the amount of optical information increases, and thus, the importance of the temperature stability of the center wavelength increases.

Ordinary optical glass has low heat resistance and thus is not suitable as a substrate material for bandpass filters. Patent Document 1 discloses a glass ceramic as a substrate material for a bandpass filter. The glass ceramic has excellent thermal expansion characteristics and mechanical strength, but has high hardness and low workability.

PRIOR ART DOCUMENT

Patent Literature

[Patent Document 1] Japanese Unexamined Patent Application Publication No. 2001-318222

SUMMARY OF THE DISCLOSURE

Technical Problem

An object of the present disclosure is to eliminate various disadvantages found in the above-mentioned related art by providing a glass ceramic for an optical filter and an optical filter having thermal expansion characteristics that prevent refractive index fluctuations at a usage temperature of a filter member, having mechanical characteristics that take into consideration durability, and further having excellent workability.

Solution to Problem

As a result of intensive testing and research in order to solve the above problems, the present inventors found that a glass ceramic of a predetermined composition can be suitably used as an optical filter having excellent light transmittance, thermal expansion characteristics, and mechanical characteristics, and further, has appropriate hardness and excellent workability, which led to the present disclosure.

The present disclosure provides the following.

(Configuration 1)

A glass ceramic for an optical filter, an internal transmittance of the glass ceramic being 0.970 or more with respect to light having a wavelength of 1550 nm when a thickness of the glass ceramic is 1 mm.

The glass ceramic contains, by mass % in terms of oxide:

40.0% to 70.0% of a $SiO_2$ component, 11.0% to 25.0% of an $Al_2O_3$ component, 5.0% to 19.0% of a $Na_2O$ component, 0% to 9.0% of a $K_2O$ component, 1.0% to 18.0% of one or more components selected from a MgO component and a ZnO component, 0% to 3.0% of a CaO component, and 0.5% to 12.0% of a $TiO_2$ component.

(Configuration 2)

The glass ceramic for an optical filter according to Configuration 1, having a thermal expansion coefficient from $70 \times 10^{-7}/°$ C. to $95 \times 10^{-7}/°$ C. at $-30°$ C. to $+70°$ C.

(Configuration 3)

The glass ceramic for an optical filter according to Configuration 1 or 2, having a Young's modulus of 78 GPa or more.

(Configuration 4)

The glass ceramic for an optical filter according to any one of Configurations 1 to 3, containing, as a main crystal phase, one or more components selected from $MgAl_2O_4$, $MgTi_2O_4$, $MgTi_2O_5$, $Mg_2TiO_4$, $Mg_2SiO_4$, $MgAl_2Si_2O_8$, $Mg_2Al_4Si_5O_{18}$, $Mg_2TiO_5$, $MgSiO_3$, $NaAlSiO_4$, $FeAl_2O_4$, and solid solutions of these.

(Configuration 5)

An optical filter obtained by forming a dielectric film on the glass ceramic according to any one of Configurations 1 to 4.

(Configuration 6)

A bandpass filter obtained by forming a dielectric film on the glass ceramic according to any one of Configurations 1 to 4.

Advantageous Effects of the Disclosure

According to the present disclosure, it is possible to provide a glass ceramic for an optical filter and an optical filter that have both thermal expansion characteristics for preventing refractive index fluctuations at a usage temperature of a filter member and mechanical characteristics considering durability, and further have excellent workability.

DETAILED DESCRIPTION OF THE EXEMPLARY EMBODIMENTS

The present disclosure is more particularly described in the following examples that are intended as illustrative only since numerous modifications and variations therein will be apparent to those skilled in the art.

As used herein, the contents of all components are expressed by mass % in terms of oxide unless otherwise specified. Here, "in terms of oxide" indicates that, when assuming that all the components constituting the glass ceramic are dissolved and converted into oxides and a total mass of the oxides is 100 mass %, an amount of oxides in each of the components contained in the glass ceramic is expressed by mass %. As used herein, "A % to B %" represents A % or more and B % or less. Further, "0%" in "0% to C %" refers to a content of 0%.

The glass ceramic according to the present disclosure contains the following components in mass % in terms of oxide:

40.0% to 70.0% of a $SiO_2$ component,
11.0% to 25.0% of an $Al_2O_3$ component,
5.0% to 19.0% of a $Na_2O$ component,
0% to 9.0% of a $K_2O$ component,
1.0% to 18.0% of one or more components selected from a MgO component and a ZnO component,
0% to 3.0% of a CaO component, and
0.5% to 12.0% of a $TiO_2$ component.

The $SiO_2$ component is a glass-forming component forming a network structure of glass. The $SiO_2$ component is preferably contained in an amount of 45.0% to 65.0%, and more preferably 50.0% to 60.0%.

The $Al_2O_3$ component is a component suitable for improving the mechanical strength. The $Al_2O_3$ component is preferably contained in an amount of 13.0% to 23.0%.

The $Na_2O$ component and the $K_2O$ component are components involved in ion exchange during chemical strengthening. The $Na_2O$ component is preferably contained in an amount of 8.0% to 16.0%. The $Na_2O$ component may be contained in an amount of 9.0% or more or 10.5% or more. The $K_2O$ component is preferably contained in an amount of 0.1% to 7.0%, and more preferably 1.0% to 5.0%.

The MgO component and the ZnO component are components contributing to mechanical strength. The ZnO component is a component effective in reducing the viscosity of glass. The one or more components selected from the MgO component and the ZnO component are preferably contained in an amount of 2.0% to 15.0%, more preferably 3.0% to 13.0%, and even more preferably 5.0% to 11.0%. The one or more components selected from the MgO component and the ZnO component may be the MgO component alone, the ZnO component alone, or both of the components, but preferably the MgO component alone.

The CaO component is a component contributing to the stabilization of glass. The CaO component is preferably contained in an amount of 0.01% to 3.0%, and more preferably 0.1% to 2.0%.

The $TiO_2$ component is a component that may serve as a nucleating agent for crystallization. The $TiO_2$ component is preferably contained in an amount of 1.0% to 10.0%, and more preferably 2.0% to 8.0%.

The glass ceramic may contain, as a clarifying agent, one or more components selected from an $Sb_2O_3$ component, a $SnO_2$ component, and a $CeO_2$ component in an amount of 0.01% to 3.0% (preferably 0.03% to 2.0%, and more preferably 0.05% to 1.0%).

The above-mentioned blending amounts may be appropriately combined.

The one or more components selected from the $SiO_2$ component, the $Al_2O_3$ component, the $Na_2O$ component, the MgO component, and the ZnO component; and the $TiO_2$ component may combinedly be contained in an amount of 90% or more, preferably 95% or more, even more preferably 98% or more, and still more preferably 98.5% or more.

The one or more components selected from the $SiO_2$ component, the $Al_2O_3$ component, the $Na_2O$ component, the $K_2O$ component, the MgO component, and the ZnO component; the CaO component; the $TiO_2$ component; and the one or more components selected from the $Sb_2O_3$ component, the $SnO_2$ component, and the $CeO_2$ component may combinedly be contained in an amount of 90% or more, preferably 95% or more, more preferably 98% or more, and still more preferably 99% or more. These components may also account for 100% of the glass ceramic.

The glass ceramic may or may not contain a $ZrO_2$ component, as long as the effect of the present disclosure is not impaired. The blending amount may be 0% to 5.0%, 0% to 3.0%, or 0% to 2.0%.

As long as the effect of the present disclosure is not impaired, the glass ceramic may or may not contain a $B_2O_3$ component, a $P_2O_5$ component, a BaO component, a FeO component, a $Li_2O$ component, a SrO component, a $La_2O_3$ component, a $Y_2O_3$ component, a $Nb_2O_5$ component, a $Ta_2O_5$ component, a $WO_3$ component, a $TeO_2$ component, and a $Bi_2O_3$ component. The blending amount of each of the components may be 0% to 2.0%, 0% or more and less than 2.0%, or 0% to 1.0%.

Other components not described above may be added to the glass ceramic according to the present disclosure as necessary, as long as the characteristics of the glass ceramic according to the present disclosure are not impaired. For example, the glass ceramic according to the present disclosure may be colorless and transparent, but the glass may be colored, as long as the characteristics of the glass ceramic are not impaired.

There is a tendency to refrain from using components of Pb, Th, Tl, Os, Be, and Se, which are considered in recent years to be harmful chemical substances, and therefore, it is preferable that the glass ceramic substantially does not contain these components.

The glass ceramic according to the present disclosure contains, as a main crystal phase, one or more components selected from $ZnAl_2O_4$, $Zn_2Ti_3O_8$, $Zn_2SiO_4$, $ZnTiO_3$, $Mg_2SiO_4$, $Mg_2Al_4Si_5O_{18}$, $NaAlSiO_4$, $Na_2Zn_3SiO_4$, $Na_4Al_2Si_2O_9$, $LaTiO_3$, and solid solutions thereof, for example.

The "main crystal phase" as used herein corresponds to a crystalline phase contained in the largest amount in the glass ceramic, which is determined from the peak of the X-ray analysis diagram.

When a glass ceramic is used for an optical filter, if the light transmittance is low, it is naturally difficult to extract a signal (decrease in S/N ratio), and thus, the light transmittance is preferably large and needs to be at least 60% or more. The glass ceramic according to the present disclosure has an internal transmittance of 0.970 or more with respect to light having a wavelength of 1550 nm in a sample thickness of 1 mm. The internal transmittance is preferably 0.980 or more, more preferably 0.985 or more, still more preferably 0.990 or more, and particularly preferably 0.995 or more. The upper limit of the internal transmittance is normally less than 1.000, for example, 0.999 or less. The light transmittance can be measured by the methods described in the Examples.

As described above, a glass ceramic for an optical filter is required to have temperature stability at the center wavelength of the band, and it is preferable that the temperature stability is higher than the thermal expansion coefficient of a film-forming material. The thermal expansion coefficient at $-30°$ C. to $+70°$ C. of the glass ceramic according to the present disclosure is normally $70\times10^{-7}/°$ C. to $95\times10^{-7}/°$ C., for example, $73\times10^{-7}/°$ C. to $93\times10^{-7}/°$ C., or $75\times10^{-7}/°$ C. to $90\times10^{-7}/°$ C. The thermal expansion coefficient can be measured by the methods described in the Examples.

In consideration of harsh usage conditions, it is desired that a glass ceramic for an optical filter resists mechanical deformation. A film of the glass ceramic is formed as a substrate material and then processed into a very small chip shape, so that the glass ceramic needs to have a high Young's modulus. The glass ceramic according to the present disclosure preferably has a Young's modulus of 78 GPa or more. The Young's modulus is more preferably 79 GPa or more, and still more preferably 80 GPa or more. The upper limit of the Young's modulus is normally 95 GPa or less, for example 90 GPa or less. The Young's modulus can be measured by the methods described in the Examples.

The glass ceramic according to the present disclosure preferably has a Vickers hardness (200 g weight) of 550 to 700. For example, the Vickers hardness is 580 to 650. The abrasion is preferably 50 to 100. For example, the abrasion is 70 to 95. In the glass ceramic of the present disclosure, the hardness is not too hard, the abrasion is not too low, and the workability is excellent. The Vickers hardness and the abrasion can be measured by the methods described in the Examples.

The glass ceramic according to the present disclosure may be manufactured by the following method. That is, raw materials are uniformly mixed and the mixed raw materials are melted and molded to produce a raw glass. Next, the raw glass is crystallized to manufacture the glass ceramic. Further, the glass ceramic may be used as a base material and a compressive stress layer may be formed to strengthen the glass ceramic.

The raw glass is subjected to heat treatment to precipitate crystals in the glass. The heat treatment may be performed at a one-stage temperature or a two-stage temperature.

The two-stage heat treatment includes a nucleation step of firstly treating the raw glass by heat at a first temperature and a crystal growth step of treating, after the nucleation step, the raw glass by heat at a second temperature higher than that in the nucleation step.

In the one-stage heat treatment, the nucleation step and the crystal growth step are continuously performed at the one-stage temperature. Typically, the temperature is raised to a predetermined heat treatment temperature, is maintained for a certain period of time after reaching the predetermined heat treatment temperature, and is then lowered.

The first temperature of the two-stage heat treatment is preferably $600°$ C. to $750°$ C. A retention time at the first temperature is preferably 30 minutes to 2000 minutes, and more preferably 180 minutes to 1440 minutes.

The second temperature of the two-stage heat treatment is preferably $650°$ C. to $850°$ C. A retention time at the second temperature is preferably 30 minutes to 600 minutes, and more preferably 60 minutes to 300 minutes.

When the heat treatment is performed at the one-stage temperature, the heat treatment temperature is preferably $600°$ C. to $800°$ C., and more preferably $630°$ C. to $770°$ C. A retention time at the heat treatment temperature is preferably 30 minutes to 500 minutes, and more preferably 120 minutes to 400 minutes.

When forming a compressive stress layer on a substrate to increase the strength thereof, means such as grinding and polishing are usually used to form a thin plate-shaped glass ceramic from a glass ceramic. Subsequently, a compressive stress layer is formed on the glass ceramic substrate.

An example of a method for forming the compressive stress layer includes a chemical strengthening method in which, for example, an alkaline component present in a surface layer of the glass ceramic is subjected to an exchange reaction with an alkaline component having a larger ionic radius to form the compressive stress layer on the surface layer. Other examples include a heat strengthening method in which the glass ceramic is heated and then quenched, and an ion implantation method in which ions are implanted into the surface layer of the glass ceramic.

The chemical strengthening method may be implemented according to the following steps, for example. A glass-ceramic base material is contacted to or immersed in a salt containing potassium or sodium, for example, a molten salt of potassium nitrate ($KNO_3$) and sodium nitrate ($NaNO_3$) or a mixed salt or a complex salt thereof. The treatment of contacting or immersing the glass-ceramic base material to or in the molten salt (chemical strengthening treatment) may be performed in one stage or in two stages.

For example, in the case of the two-stage chemical strengthening treatment, in a first stage, the glass-ceramic base material is contacted to or immersed in a sodium salt or a mixed salt of potassium and sodium heated at $350°$ C. to $550°$ C., for 1 to 1440 minutes, preferably 90 to 800 minutes. Subsequently, in a second stage, the resultant glass-ceramic base material is contacted to or immersed in a potassium salt or a mixed salt of potassium and sodium heated at $350°$ C. to $550°$ C., for 1 to 1440 minutes, preferably 60 to 800 minutes.

In the case of the one-stage chemical strengthening treatment, the glass-ceramic base material is contacted to or immersed in a salt containing potassium or sodium or a mixed salt thereof heated at $350°$ C. to $550°$ C. for 1 to 1440 minutes, preferably 60 to 800 minutes.

In the heat strengthening method it is possible, for example, to heat the glass-ceramic base material to $300°$ C. to $600°$ C., and thereafter, perform rapid cooling such as water cooling and/or air cooling to form the compressive stress layer by a temperature difference between the surface and the inside of the glass substrate. When the heat strengthening method is combined with the above chemical treatment method, it is possible to more effectively form the compressive stress layer.

In the ion implantation method, for example, any type of ion may be caused to collide with the surface of the glass-ceramic base material at an acceleration energy and an acceleration voltage that do not destroy the surface of the base material, to implant the ions into the surface of the base material. Thereafter, by performing heat treatment as necessary, it is possible to form the compressive stress layer on the surface in a similar manner as in the other methods.

The glass ceramic according to the present disclosure can be used in an optical filter and is suitable for an interference-type optical filter in which a dielectric multilayer film is formed on the surface of a substrate. In particular, the glass ceramic is suitable for a bandpass filter having a structure in which a dielectric thin film (H layer) having a high refractive index and a dielectric thin film (L layer) having a low refractive index are alternately laminated as the dielectric multilayer film.

The dielectric is preferably an inorganic oxide such as $TiO_2$, $Ta_2O_2$, $Nb_2O_5$, and $SiO_2$. In a bandpass filter used in a wavelength range of 950 nm to 1600 nm, the dielectric layer preferably has an H layer/L layer combination such as $TiO_2/SiO_2$, $Ta_2O_2/SiO_2$, and $Nb_2O_5/SiO_2$. The optical filter according to the present disclosure can be obtained by forming a dielectric thin film on the surface of a glass-ceramic substrate. Examples of the film forming method include a vapor deposition method, an RF ion plating method, a magnetron sputtering method, and a plasma ion plating method. The vapor deposition method is preferable among the above-mentioned methods.

EXAMPLES

Examples 1 to 5

1. Production of Glass Ceramic

Raw materials such as oxides, hydroxides, carbonates, nitrates, fluorides, chlorides, and metaphosphate compounds corresponding to each raw material of each component of the glass ceramic were selected, and the selected raw materials were weighed and mixed uniformly to have the following composition ratios.

(Mass % in terms of oxide)

A $SiO_2$ component was 54%, an $Al_2O_3$ component was 18%, a $Na_2O$ component was 12%, a $K_2O$ component was 2%, a MgO component was 8%, a CaO component was 1%, a $TiO_2$ component was 5%, and an $Sb_2O_3$ component was 0.1%

Next, the mixed raw materials were fed into and melted in a platinum crucible. Subsequently, the molten glass was stirred and homogenized, cast into a mold, and slowly cooled to prepare raw glass.

The obtained raw glass was subjected to a one-stage heat treatment (at 665 to 760° C., for five hours) for nucleation and crystallization to produce a glass ceramic. The crystallization temperature in Example 1 was 665° C., the crystallization temperature in Example 2 was 705° C., the crystallization temperature in Example 3 was 720° C., the crystallization temperature in Example 4 was 740° C., and the crystallization temperature in Example 5 was 760° C. The crystal phases were determined from an angle of a peak appearing in an X-ray diffraction pattern obtained by using an X-ray diffraction analyzer (D8 Discover manufactured by Bruker). The main crystal phases of $MgAl_2O_4$ and $MgTi_2O_4$ were confirmed.

The manufactured glass ceramic was cut and ground, and opposing sides of the resultant glass ceramic were further polished in parallel to obtain a glass-ceramic substrate having a thickness of 1 mm.

2. Evaluation of Glass Ceramic

The following physical characteristics of the obtained glass ceramic were measured. The results are shown in Table 1.

(1) Internal Transmittance

According to the Japan Optical Glass Industry Association Standard JOGIS17-2012 "Measuring Method for Internal Transmittance of Optical Glass", the spectral transmittance including the reflection loss of the glass ceramic after polishing opposing sides in parallel was measured at thicknesses of 1 mm and 10 mm, and the internal transmittance (spectral transmittance not including the reflection loss) of the glass ceramic having a thickness of 1 mm was obtained by calculation.

(2) Thermal Expansion Coefficient

The thermal expansion coefficient was obtained from the thermal expansion curve obtained by measuring the relationship between the temperature and the elongation of a sample according to the Japan Optical Glass Industry Association Standard JOGIS16-2003 "Measuring Method for Average Linear Thermal Expansion Coefficient of Optical Glass at Normal Temperature".

(3) Young's Modulus

The Young's modulus was measured by an ultrasonic method.

(4) Vickers Hardness

A square pyramid diamond indenter having an angle of 136° between opposing sides was used to measure the Vickers hardness as a value obtained by dividing the load when the pyramid-shaped depression was formed on the test surface by the surface area ($mm^2$) calculated from the length of the depression.

The measurement was performed using a microhardness tester MVK-E manufactured by Akashi Seisakusho, Ltd. with a test load of 200 gf and a retention time of 10 seconds.

(5) Abrasion

The abrasion was measured according to the Japan Optical Glass Industry Association Standard JOGIS10-1994 "Measuring Method for Abrasion of Optical Glass". That is, a sample of a glass square plate having a size of 30×30×10 mm was placed at a fixed position 80 mm from the center of a cast iron flat plate (250 mm φ) rotating horizontally 60 times per minute. While applying a vertical load of 9.8 N (1 kgf), a polishing solution obtained by adding 10 g of #800 (average particle diameter of 20 μm) lapping material (alumina A abrasive grains) to 20 mL of water was uniformly supplied for 5 minutes to rub the glass square plate. Finally, the sample mass before and after lapping was measured to determine the wear mass. Similarly, the wear mass of a standard sample specified by the Japan Optical Glass Industry Association was determined, and the abrasion was calculated by:

$$Abrasion = \{(\text{Wear mass/specific gravity of test sample})/(\text{Wear mass/specific gravity of standard sample})\} \times 100.$$

Comparative Example 1

A glass ceramic was produced and evaluated similarly as in Example 1, except that the composition of the glass ceramic was changed as described below and the crystallization temperature was set to 750° C. The results are shown in Table 1.

(Mass % in terms of oxide)

A $SiO_2$ component was 76.0%, an $Al_2O_3$ component was 6.4%, a $P_2O_5$ component was 2.0%, a $ZrO_2$ component was 3.0%, a ZnO component was 0.6%, a MgO component was 0.5%, a CaO component was 0.3%, a $Li_2O$ component was 10.0%, a $K_2O$ component was 1.0%, and an $Sb_2O_3$ component was 0.2%.

Comparative Example 2

A glass was produced and evaluated similarly to Example 1, except that the composition of the glass was changed as described below and the glass was not crystallized. The results are shown in Table 1.

(Mass % in terms of oxide)

A $SiO_2$ component was 65.0%, a $B_2O_3$ component was 13.6%, an $Al_2O_3$ component was 2.0%, a ZnO component was 1.5%, a BaO component was 3.0%, a $Na_2O$ component was 7.4%, a $K_2O$ component was 7.0%, and an $Sb_2O_3$ component was 0.5%.

TABLE 1

| | | Examples | | | | | Comparative Example 1 | Comparative Example 2 |
|---|---|---|---|---|---|---|---|---|
| | | 1 | 2 | 3 | 4 | 5 | | |
| Internal transmittance (τ/1 mmt) | 320 | 0.010 | 0.010 | | | | 0.564 | 0.978 |
| | 350 | 0.785 | 0.786 | | | | 0.610 | 0.990 |
| | 400 | 0.961 | 0.961 | 0.001 | 0.001 | 0.001 | 0.692 | 0.994 |
| | 440 | 0.967 | 0.968 | 0.002 | 0.002 | 0.002 | 0.758 | 0.994 |
| | 500 | 0.971 | 0.972 | 0.012 | 0.012 | 0.012 | 0.831 | 0.995 |
| | 550 | 0.977 | 0.977 | 0.056 | 0.056 | 0.056 | 0.873 | 0.995 |
| | 600 | 0.983 | 0.984 | 0.151 | 0.151 | 0.151 | 0.903 | 0.995 |
| | 650 | 0.990 | 0.990 | 0.281 | 0.281 | 0.281 | 0.925 | 0.995 |
| | 700 | 0.994 | 0.994 | 0.415 | 0.415 | 0.416 | 0.941 | 0.995 |
| | 800 | 0.997 | 0.998 | 0.636 | 0.636 | 0.637 | 0.962 | 0.992 |
| | 900 | 0.999 | 0.999 | 0.774 | 0.774 | 0.775 | 0.975 | 0.999 |
| | 1000 | 0.999 | 0.999 | 0.859 | 0.859 | 0.860 | 0.982 | 0.999 |
| | 1200 | 0.999 | 0.999 | 0.939 | 0.939 | 0.940 | 0.990 | 0.999 |
| | 1400 | 0.999 | 0.999 | 0.965 | 0.965 | 0.966 | 0.994 | 0.999 |
| | 1500 | 0.999 | 0.999 | 0.978 | 0.978 | 0.979 | 0.999 | 0.999 |
| | 1550 | 0.999 | 0.999 | 0.980 | 0.980 | 0.981 | 0.996 | 0.999 |
| | 1600 | 0.999 | 0.999 | 0.983 | 0.983 | 0.985 | 0.996 | 0.999 |
| | 1800 | 0.999 | 0.999 | 0.987 | 0.987 | 0.988 | 0.997 | 0.999 |
| | 2000 | 0.999 | 0.999 | 0.990 | 0.990 | 0.991 | 0.997 | 0.999 |
| | 2200 | 0.999 | 0.999 | 0.956 | 0.956 | 0.957 | 0.994 | 0.997 |
| | 2400 | 0.999 | 0.999 | 0.959 | 0.959 | 0.961 | 0.995 | 0.990 |
| Thermal expansion coefficient ($10^{-7}/°$ C.) | (−30 to +70) | 81 | 79 | 79 | 80 | 85 | 101 | 67 |
| Young's modulus (GPa) | | 80.6 | 80.6 | 81.0 | 83.0 | 84.3 | 97.4 | 76.5 |
| Vickers hardness (200 g weight) | Hv_200 gf | 619 | 626 | 622 | 616 | 621 | 755 | 613 |
| Abrasion | Aa | 78 | — | 86 | 86 | — | 31 | 88 |

The documents described in this specification and the entire disclosure (including description, drawings, and claims) of the Japanese patent application specification, which is the basis for the priority of the present application under the Paris Convention, are incorporated herein by reference.

What is claimed is:

1. A glass ceramic for an optical filter, an internal transmittance of the glass ceramic being 0.970 or more with respect to light having a wavelength of 1550 nm when a thickness of the glass ceramic is 1 mm;

the glass ceramic comprising, as a main crystal phase, one or more components selected from $MgAl_2O_4$, $MgTi_2O_4$, and solid solutions of these, wherein by mass % in terms of oxide:

a content of a $SiO_2$ component is 40.0% to 70.0%;

a content of an $Al_2O_3$ component is 11.0% to 25.0%;

a content of a $Na_2O$ component is 5.0% to 19.0%;

a content of a $K_2O$ component is 0% to 9.0%;

a total content of a MgO component and a ZnO component is 1.0% to 18.0%;

a content of a CaO component is 0% to 3.0%; and a content of a $TiO_2$ component is 0.5% to 12.0%.

2. The glass ceramic for an optical filter according to claim 1, wherein a thermal expansion coefficient at −30° C. to +70° C. is $70×10^{-7}/°$ C. to $95×10^{-7}/°$ C.

3. The glass ceramic for an optical filter according to claim 1, wherein a Young's modulus is 78 GPa or more.

4. An optical filter obtained by forming a dielectric film on the glass ceramic according to claim 1.

5. A bandpass filter obtained by forming a dielectric film on the glass ceramic according to claim 1.

6. The glass ceramic for an optical filter according to claim 2, wherein a Young's modulus is 78 GPa or more.

7. An optical filter obtained by forming a dielectric film on the glass ceramic according to claim 2.

8. An optical filter obtained by forming a dielectric film on the glass ceramic according to claim 3.

9. A bandpass filter obtained by forming a dielectric film on the glass ceramic according to claim 2.

10. A bandpass filter obtained by forming a dielectric film on the glass ceramic according to claim 3.

* * * * *